UNITED STATES PATENT OFFICE.

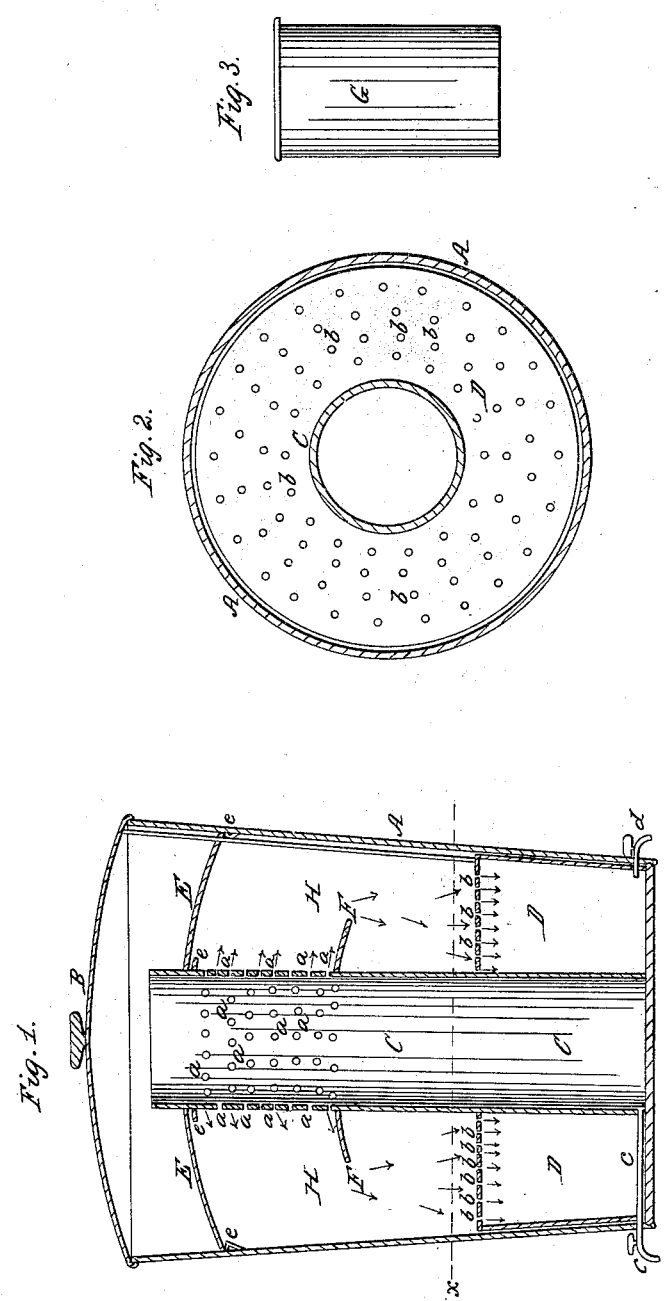

HENRY M. SEAVEY, OF CHICAGO, ILLINOIS.

IMPROVEMENT IN FILTERS AND COOLERS.

Specification forming part of Letters Patent No. 44,558, dated October 4, 1864.

*To all whom it may concern:*

Be it known that I, HENRY M. SEAVEY, of Chicago, in the county of Cook and State of Illinois, have invented a new and useful Improved Combined Water Filter and Cooler; and I do hereby declare that the following is a full, clear, and exact description thereof, reference being had to the accompanying drawings and the letters and figures marked thereon, which form part of this specification.

In said drawings, which are hereunto annexed, Figure 1 represents a central vertical section of my invention; Fig. 2, a plan or top view thereof in section at the line $x$ in Fig. 1, and Fig. 3 represents a cylinder to be inserted into the upper part of the chamber C, when the apparatus is to be used for a cooler alone.

The nature of my invention consists in a novel combination and arrangement of parts in a water-filter, whereby the same shall act as a cooler also, and in which the iced water is filtered and deposited in a reservoir which surrounds and incloses the ice-chamber, and thus is kept perfectly cool, while at the same time the impurities contained in the ice are kept free from the reservoir, and the ice, by means of the interior position thereof, melts much less rapidly than as arranged in other filters, thus saving the ice, which can be saved to a still greater degree by drawing off the water from the ice when the reservoir is filled, when the ice melts much less rapidly than when in water.

My invention further consists in a novel device whereby the filter is converted into a cooler alone when desired.

To enable those skilled in the art to understand how to construct and use my invention, I will now proceed to describe the same with particularity, reference being made to the aforesaid drawings.

A represents the outside tub, which may be of oak or other suitable material. B is the removable cover thereof, to be removed when water is to be introduced into the filter.

C represents a deep tube or well, extending from near the top of the outside tub, A, to the bottom thereof, where it is made water-tight by being embedded in cement or in any other suitable manner. The walls of this well or chamber are water-tight until we reach the height of about two-thirds its entire length, above which point there are preforations $a$, made in the said cylindrical wall, through which water may escape into the space inclosed between the said walls and the outside tub, A. Extending entirely around the lower part of the said well or chamber C is the reservoir D, for filtered water. This reservoir is made perfectly tight excepting the perforations $b$ in the top, and is entirely isolated and unconnected with C, and is made water-tight at the bottom by being embedded in cement or otherwise, as may be preferred.

E represents an inner cover, which covers the filtering material occupying the annular space between the interior chamber, C, and the tub A, above the perforated top of the reservoir D. Said cover E is supported upon the projections or ledges $e$ $e$.

F represents an annular ledge passing around the chamber C, below the preforations $a$, to carry the water off to the center of the filtering material so as to more perfectly effect the filtering of the water; and $t$ represents an air-tube to allow the air to escape from the reservoir when being filled. $c$ represents a stop-cock, whereby the water in the well C is drawn off; and $d$ is a similar device for drawing water from the reservoir for use.

Having described the construction of my invention, I will now proceed to describe its operation.

The filtering material is placed in the chamber H, and is packed closely around the chamber C in the usual manner. The ice is then placed in the bottom of the well C, and the water poured in upon it until the water rises high enough in the well to pass through the perforations $a$, when it permeates the filtering material and percolates into the reservoir D through the perforations $b$.

The water is cooled before filtering, and thus the impurities contained in the ice are thoroughly cleansed out and removed from the water before the same enters the reservoir, where it remains perfectly pure and clean, to be drawn out as needed for use.

It will be observed that although no ice is put into the reservoir, yet as a body of ice lies within the chamber C, which the water in the reservoir entirely surrounds, it is kept just as cool as though the ice was immersed in it, while the water is kept free from the impurities contained in the ice. The position of the ice is such also that it melts much less rapidly than in other filters; and, furthermore, the water can be drawn off from the ice when the reservoir is full, when the melting of the ice is still more retarded, and a still greater saving of ice is obtained.

When it is desired to use the apparatus as a cooler alone, the cylinder G is inserted at the top of the well C, extending down so as to cover all the perforations $a$, so that C can be filled with water and ice put in and the water cooled without filtering, and drawn off through the stop-cock $c$ for use. It will be seen that most of the impurities in the water and ice will be deposited in the bottom of the well C, from which it may be readily removed, and the apparatus cleansed by scalding and rinsing out C, the sediment passing out at $c$.

Having now described my improved filter and cooler, I will proceed to specify what I claim as new therein and desire to secure by Letters Patent.

1. The combination and arrangement of the reservoir D and ice-chamber C, when the latter is isolated from the former and arranged within it, as shown, and is provided with the perforations $a$, substantially as and for the purposes herein shown and described.

2. In combination with the above, the employment of the removable cylinder G, as and for the purposes specified and shown.

HENRY M. SEAVEY.

Witnesses:
  LEWIS L. COBURN,
  W. E. MARRS.